UNITED STATES PATENT OFFICE.

CHARLES LEE PECK, OF NEW YORK, N. Y., ASSIGNOR TO THE DORR COMPANY, A CORPORATION OF DELAWARE.

PROCESS OF SEWAGE TREATMENT.

1,392,211.   Specification of Letters Patent.   Patented Sept. 27, 1921.

No Drawing.   Application filed March 27, 1920.   Serial No. 369,201.

*To all whom it may concern:*

Be it known that I, CHARLES LEE PECK, a citizen of the United States, residing at New York city, in the county of New York, State of New York, have invented certain new and useful Improvements in Processes of Sewage Treatment; and I do hereby declare the following to be a full, clear, and exact description of the invention, such as will enable others skilled in the art to which it appertains to make and use the same.

This invention relates to improvements in the process of treating sewage by aeration in the presence of bacterial sludge, by the method commonly known as the activated sludge process.

In treating sewage by this method it has hitherto been customary to subject the raw sewage to a preliminary settling treatment, whereby the coarser suspended particles are removed by ordinary screening methods, and then subject the main bulk of the liquid containing the finely divided solids and soluble material to the combined action of a specially prepared bacterial sludge known as activated sludge, and of air which is usually blown through the liquid in the form of small bubbles.

This activated sludge is commonly prepared by blowing air in the form of small bubbles through the raw decanted sewage for a period of about ten days, at the end of which time the supernatant liquid becomes clear and the sediment reaches its maximum condition of activity or power of clarifying and purifying sewage in the presence of air. If, for example, this sediment or sludge prepared in this way is separated and applied to the treatment of fresh portions of raw sewage in conjunction with aeration, the time required for complete clarification and purification is reduced from about ten days to about six to ten hours. This increased activity of the sludge is due to the accumulation of a characteristic flora of bacteria and other organisms in the sludge which have the power of promoting the rapid oxidation of the organic material in the sewage, and also of bringing about the coagulation of much of the suspended and colloidal matter. The organic constituents, including nitrogenous material, are thus converted in part into soluble products, such as nitrates, carbon dioxid, carbonates, etc., and in part into a coagulate or sediment which settles out of solution.

The additional sludge or sediment which accumulates as fresh portions of sewage are subjected to the treatment, can be collected by sedimentation and used as fertilizer. It is known that this accumulated sludge contains a higher percentage of nitrogen than the sludge which is obtained from other processes of sewage purification, such as the septic tank process and the various processes which employ contact beds or broken stone, gravel and the like. The marketable value of the sludge so produced, taken in connection with the clear innocuous character of the effluent, and the small area required for a suitable equipment, are the main features of the activated sludge process of sewage treatment which have seemed to give it such promising advantages over all other methods of sewage treatment.

Notwithstanding these inherent advantages the process in actual use has given erratic and unsatisfactory results, due in large part to erratic and uncontrollable fluctuations in the precentage of nitrogen in the accumulated sludge and in the total amount of recoverable nitrogen per unit volume of sewage treated. Also the somewhat colloidal character of the sludge frequently obtained makes it difficult to collect by sedimentation and to dewater for transportation, and also imparts a slimy character to the final product which renders it objectionable for handling when applying it to the soil.

In my application, Serial No. 360,202 filed March 27, 1920, I have described new and improved methods for the preliminary treatment of the raw sewage, and also improved methods for aerating and controlling the time of contact of the sewage with the activated sludge which overcome many of these difficulties just mentioned and which also have the effect of simplifying the entire process and reducing the cost of treatment.

In addition to these improvements, I have now discovered other new and improved means of obtaining accumulated sludge containing uniformly high percentages of nitrogen and yielding uniformly high values of recoverable nitrogen per unit volume of sewage treated and possessing a desirable granular character, so that it can be readily dewatered and dried for transportation and use as a fertilizer.

For example, in respect to the richness of the sludge obtained in my process, I am able consistently to obtain accumulated sludge containing from 7 per cent. upward to about 9 per cent. of nitrogen calculated as elementary nitrogen in the dry sludge.

Furthermore, I am able by my process not only to recover substantially all the suspended solids originally present in the sewage, but also I am able actually to increase the amount of these suspended solids and to recover them in the sludge. Thus in my process the amount of accumulated sludge may exceed the total amount of suspended solids originally present by as much as 60 per cent. and commonly is in excess by about 40 per cent. This important result is due to the conversion of soluble constituents in the sewage such as nitrates into insoluble solid form, largely through the assimilation of these soluble substances into the bodies of the organisms which multiply and grow in the sludge.

The consistently high nitrogen content of the sludge obtained in my process and the uniformly large amounts of sludge produced and collected make it possible to recover very high values of total nitrogen from a given volume of sewage treated by my process. Thus from one million gallons of raw sewage treated containing 0.748 ton of suspended solids, I have obtained 1.178 tons of accumulated fertilizer sludge containing 7.97 per cent. nitrogen calculated as ammonia upon the dry sludge and having a value of $56.32 at the rate of $6 per unit of ammonia.

In the process of the present invention these advantageous results are obtained by creating a specially favorable environment for the growth of the desirable organisms and by controlling the density and colloidal and slimy character of the sediment.

Thus I have found that the production and maintenance of a particular range of alkalinity or basicity in the sewage favors the growth of the desirable organisms (thus increasing the activity of the sludge), and also increases the total amount of recoverable nitrogen in the accumulated sludge.

Furthermore, I have found that the addition of certain metals and metallic salts to the sewage also increases the yield of recoverable nitrogen in the sludge from a given amount of sewage treated, and in addition exercises a beneficial effect upon the colloidal nature of the accumulated sludge, rendering it more readily recoverable by sedimentation and increasing the ease with which it is dewatered and dried. Particularly, I prefer to add metallic iron or certain compounds of iron such as iron hydroxid or carbonate of iron, and similar compounds of iron, which when hydrolyzed yield iron hydroxid and a very weak acid. Instead of the compounds of iron of the character just described I may add compounds of other non-toxic metals, which upon hydrolysis yield an insoluble hydroxid of the metal and a very weak acid. Thus I may add carbonates and hydroxids of manganese and the corresponding compounds of titanium, aluminum and other metals which belong to the group known as metals of the earth oxid group.

Also, I have found that the addition of finely ground or colloidal mineral fertilizer materials, such as phosphate rock, green sand and the like, to the sewage assists in maintaining a condition which is favorable to high yields of recoverable nitrogen in the accumulated sludge, and at the same time there is no loss of the fertilizer material itself, which is completely recovered in the sludge and therefore adds to its marketable value. I prefer to add these inorganic fertilizers in a finely ground condition, as for example, in the form of a powder which will pass a 300 mesh sieve and to subject the sewage containing the sludge and added materials to a thorough agitation as in the aerating tanks, whereby the added inorganic fertilizer materials are thoroughly incorporated in and disseminated through the accumulated sludge. By selecting inorganic fertilizer materials of proper density and by regulating the amount added, I am thus enabled to increase and to control and regulate the mean or average density of the accumulated sludge, thereby rendering it more readily settleable and more easily dewatered and dried. Furthermore, the addition of fertilizer materials of this general character overcomes the objectionable slimy character of the accumulated sludge, so that it can be more readily handled in applying it to the soil.

Another means which I employ in my process for creating specially favorable conditions in the sewage for the growth of the desirable organisms in the activated sludge consists in increasing the organic constituents of the sewage in respect to those materials which serve as food for these organisms during their growth. For example, I may add certain trade waste liquors such as packing house effluents, or I may add waste vegetable products such as sawdust, garbage and the like, or I may add the screenings obtained in the process of my application, Serial No. 369,202.

In addition to thus supplying more nutrient material for the use of the growing organisms, I also by this means combine a satisfactory disposal of sewage with a satisfactory disposal of garbage, and at the same time I recover the fertilizer values of these various organic waste products in the accumulated sludge.

Still another advantage of adding certain waste organic materials to the sewage lies in the favorable effect produced by certain insoluble cellular and fibrous constituents of these waste materials upon the porous character of the accumulated sludge, whereby it is prevented from forming a compact mass upon settling, which cannot be readily dewatered especially by centrifugal treatment. Also the presence of a limited amount of such cellular and fibrous material in the sludge imparts a more friable character to the dried sludge, which renders the product more desirable for transporting and handling.

As previously mentioned it will be seen that in my new improved process of activated sludge treatment of sewage, I maintain conditions in respect to both the inorganic and organic constituents of the sewage which are favorable to the maximum activity of the sludge and to the production of high yields of recoverable nitrogen in the sludge, as well as to the production of a fertilizer material which can be more readily collected, dewatered and dried in marketable form. On this account it is usually unnecessary in my process to inoculate the sewage with any particular organism, as has been proposed by other workers in this field as a means of increasing the efficiency of the process and of avoiding the erratic results which frequently render the process impracticable in actual operation. The important factor in my process is the production and maintenance in the sewage of a suitable supply of inorganic and organic constituents of the character which I have described. When these conditions are maintained in the sewage a bacterial flora will usually develop in the sludge without inoculation which is best suited to survival in the particular sewage being treated, and also best suited for the production of a satisfactory effluent and a marketable fertilizer sludge of high nitrogen content.

While I do not attribute the advantageous results of my process to the predominance of any particular organism in the activated sludge, I have found that the organisms bacillus crenothrix and vorticelli are as a rule predominant, and that there is also always present a large number of nitrogen-fixing bacteria.

In the event that satisfactory organisms do not develop in the activated sludge within a reasonable length of time, I may inoculate with any organisms of the character just described in order to hasten the production of sludge of satisfactory activity. But it will be understood that the inoculation alone will not bring about the desirable results which I obtain. If the constituents of the sewage, especially as respects its limited degree of alkalinity and the presence of certain kinds of nutrient constituents, are not maintained, the organism with which the sewage is inoculated may not persist as a predominant constituent of the sludge, and the activity of the sludge may become greatly decreased.

One of the reasons why the accumulated sludge obtained by my process is more readily separated by sedimentation and more readily dewatered and dried, is that insoluble earth oxids separate out in the sludge partly in the cell walls of the organisms in such form that the density and granular character of the sludge are increased thereby.

As a result of this separation of insoluble earth oxids in the cell walls of the organisms, it may happen that free acid is liberated in the immediate vicinity of the growing organisms, which may thereby be inhibited in respect to some of their functions. This free acid results from the decomposition of the metallic compounds of earth oxid metals brought about by hydrolysis and by the storing up of the resulting hydroxid in the bodies of the organisms. When the metallic compounds present are of such character that the free acid thus liberated is a strong acid, the growth of the organisms may be inhibited and the activity of the sludge thereby decreased. This is one reason why I prefer to add to the sewage only such compounds of the metals of the earth oxid group as will yield only weak acids or neutral products when they are hydrolyzed and the resulting hydroxids removed from the solution by coagulation or absorption in the bodies of the organisms.

It will be seen that this production of acid in the immediate vicinity of the organisms may take place even when the sewage as a whole shows an alkaline reaction toward indicators. Many of the organisms present have gelatinous sheaths surrounding the cell walls, or may be embedded in a jelly-like mass which may prevent diffusion of the acid into the main body of the sewage where it would be neutralized by the excess alkali or base present.

Respecting the degree of alkalinity of the sewage as a whole which I prefer to use in my process, I have found that a sewage which contains about 200 parts per million of base, calculated as calcium carbonate, and using methyl orange indicator in determining the neutral point, is a favorable medium in which to maintain the activity of the sludge at a maximum value. However, I have found that the nature of the base present in the sewage exercises an important influence upon the activity of the sludge, and upon the production of an accumulated sludge of desirable character and nitrogen content. Thus, if the 200 parts per million of base mentioned above are composed entirely of sodium hydroxid or similar alkali metal hydroxid, or alkaline earth hydroxid, the results obtained are not so satisfactory as they would be if the entire alkalinity is due to the presence of a weak basic material alone, such as calcium carbonate and the like. In other words I prefer that the sewage shall have a hydroxid ion concentration varying between about $1 \times 10^9$ and $1 \times 10^3$ normality, taking $1 \times 10^7$ as the hydroxyl ion concentration of pure neutral water. This means, of course, that the sewage may vary from very slightly acid to slightly alkaline, taking pure water as the standard of neutrality.

One of the most striking features of my process is that the sludge obtained is not only high in nitrogen, but the actual amount of nitrogen in the sludge and effluent is greater than that introduced in the original sewage. This increase over the amount present in the untreated sewage is due to the fixation of nitrogen from the air fed in during the process. The following examples will serve to illustrate this result:

*Example I.*

| | |
|---|---|
| Weight of total nitrogen as ammonia in the applied sewage | 1.9320 grams |
| Weight of total nitrogen as ammonia in the sludge and effluent removed | 2.7574 " |
| Gain in total nitrogen as ammonia during treatment | .8254 " |
| Percentage of gain | 42.7% |

In this example the sewage treated was kept slightly alkaline to the extent of about 150 parts per million calculated as calcium carbonate, using methyl orange to indicate the neutral point. The amount of iron compound in the sewage was maintained at the desired value during the treatment by employing activated sludge which already contained 8.5 per cent. of iron calculated as $Fe_2O_3$. The iron was present in the sewage in the form of iron hydroxid and iron carbonate.

*Example II.*

| | |
|---|---|
| Weight of total nitrogen as ammonia in the applied sewage | 1.3020 grams |
| Weight of total nitrogen as ammonia in the sludge and effluent removed | 1.6292 " |
| Gain in total nitrogen as ammonia during treatment | 0.3372 " |
| Percentage of gain | 25.1% |

In this example the conditions were approximately the same as in Example I, except that a larger bulk of activated sludge was employed and the circulation and suspension of the sludge was therefore not so complete. The percentage of iron in the sludge was 13.4 per cent., calculated at $Fe_2O_3$.

In both these examples bacillus crenothrix was predominant in the flora of the sludge, but a series of other bacteria present were responsible for the change of the added atmospheric nitrogen to a mineral or organic stage which could be assimilated by the crenothrix growth and converted into an insoluble form.

The highest percentage of nitrogen fixation is obtained when the sludge is of such volume and weight that it is kept in complete suspension by the air blown in. The method of my application, Serial No. 369,202, is peculiarly adapted to aid in bringing about this specific result, especially when combined with the method of the present application.

The fixation of atmospheric nitrogen is an especially advantageous result of great industrial importance, because the nitrogen so fixed can be utilized in various ways, as for example, by applying the effluent containing the soluble forms of the fixed nitrogen directly to the soil for fertilizer purposes; or the insoluble forms of the fixed nitrogen which constitutes a part of the accumulated sludge may be dewatered and used for fertilizer as already described.

I claim:

1. The method of treating sewage and simultaneously fixing atmospheric nitrogen and absorbing the products of fixation in the sewage which comprises subjecting the sewage to the action of an organism favorable to the clarification of the sewage and simultaneously forcing air through the sewage in the presence of a base and a compound containing the negative radical of a soluble weak acid combined with a metal capable of forming an insoluble inert hydroxid.

2. The method of treating sewage and simultaneously fixing atmospheric nitrogen and absorbing the products of fixation in the sewage which comprises subjecting the sewage to the action of an organism favorable to the clarification of the sewage and simultaneously forcing air through the sewage in the presence of a compound containing the negative radical of a soluble weak acid combined with a metal capable of forming an insoluble inert oxid.

3. The method of treating sewage and simultaneously fixing atmospheric nitrogen and absorbing the products of fixation in the sewage which comprises subjecting the sewage to the action of an organism favorable to the clarification of the sewage and simultaneously forcing air through the sewage in the presence of an insoluble inert metallic hydroxid.

4. The method of treating sewage and simultaneously fixing atmospheric nitrogen and absorbing the products of fixation in the sewage which comprises subjecting the sewage to the action of an organism favorable to the clarification of the sewage and simultaneously forcing air through the sewage in the presence of an iron hydroxid.

5. The method of treating sewage and simultaneously fixing atmospheric nitrogen and absorbing the products of fixation in the sewage which comprises subjecting the sewage to the action of an organism favorable to the clarification of the sewage and simultaneously forcing air through the sewage in the presence of a compound of iron.

6. The method of treating sewage and simultaneously fixing atmospheric nitrogen and absorbing the products of fixation in the sewage which comprises subjecting the sewage to the action of an organism favorable to the clarification of the sewage and simultaneously forcing air through the sewage in the presence of a compound of non-toxic metal capable of forming a relatively insoluble hydroxid by treatment with water.

7. The method of treating sewage which comprises subjecting the sewage to forced aeration and biological action in the presence of biological growths favorable to the clarification of the sewage, and maintaining within the sewage a favorable environment for such biological action by introducing into the sewage undergoing treatment a form of iron which upon treatment with water forms hydroxid of iron.

8. The method of treating sewage which comprises subjecting the sewage to forced aeration and biological action in the presence of biological growths favorable to the clarification of the sewage, and maintaining within the sewage a favorable environment for such biological action by introducing into the sewage undergoing treatment iron in a form conducive to the development of said favorable environment.

9. The method of treating sewage which comprises adding to the sewage an insoluble inert metallic hydroxid, a substance containing a carbohydrate, adjusting the hydroxyl-ion concentration of the sewage to a value between about $1 \times 10^3$ and $1 \times 10^9$ (based upon the value $1 \times 10^7$ as the hydroxyl-ion concentration of pure water) and aerating the sewage in the presence of an organism capable of converting a soluble form of nitrogen into an insoluble form.

10. In the activated sludge process of treating sewage, the method of increasing and regulating the density of the accumulated sludge, which comprises adding to the sewage finely ground mineral fertilizer material and agitating in the presence of activated sludge, and then collecting the intimate mixture of the sludge and said fertilizer material.

11. The method of treating sewage which comprises adjusting the hydroxyl-ion concentration of the sewage to a value between about $1 \times 10^3$ and $1 \times 10^9$ (based upon the value $1 \times 10^7$ as the hydroxyl-ion concentration of pure water) and aerating the sewage in the presence of an organism capable of converting a soluble form of nitrogen into an insoluble form.

12. The method of treating sewage which consists in increasing the nitrogen content of the sewage by nitrogen derived from air and fixed by the action of nitrogen-fixing organisms in an environment containing an effective amount of an appropriate material particularly adapted to stimulate the growth of said organisms; the aforesaid action of said organisms serving further to collect and consume organic matter contained in the sewage with the formation of aggregates of bacterial sludge, and separating said sludge from the liquor.

13. The method of increasing the nitrogen content of sewage which comprises subjecting the sewage to the action of nitrogen-fixing organisms and simultaneously forcing air through the sewage in the presence of a basic substance.

14. The method of treating sewage and simultaneously disposing of garbage and recovering the fertilizer constituents therefrom, which comprises adding the garbage to the sewage and aerating the sewage in the presence of activated sludge.

15. In the activated sludge process of treating sewage, the method of increasing the porosity of the accumulated sludge, which comprises adding comminuted insoluble organic material to the sewage, agitating in the presence of activated sludge and separating the intimate mixture of sludge and organic material from the sewage; whereby the said organic material is disseminated through and incorporated with the sludge which is thereby rendered more porous in character and more readily dewatered by draining.

16. The method of treating sewage which comprises subjecting the sewage to forced aeration and biological action in the presence of biological growths favorable to the clarification of the sewage and in the presence of a relatively insoluble hydroxid of a non-toxic metal which will maintain within the sewage a favorable environment for such biological action.

In testimony whereof I affix my signature.

CHARLES LEE PECK.